United States Patent
Agrawal

(10) Patent No.: US 8,328,889 B2
(45) Date of Patent: Dec. 11, 2012

(54) EFFICIENCY OF GASIFICATION PROCESSES

(75) Inventor: Ravindra K. Agrawal, Houston, TX (US)

(73) Assignee: Kellogg Brown & Root LLC, Houston, TX (US)

( * ) Notice: Subject to any disclaimer, the term of this patent is extended or adjusted under 35 U.S.C. 154(b) by 1042 days.

(21) Appl. No.: 11/954,455

(22) Filed: Dec. 12, 2007

(65) Prior Publication Data
US 2009/0151250 A1  Jun. 18, 2009

(51) Int. Cl.
*C10J 3/00* (2006.01)
*C01B 3/36* (2006.01)
*C01B 6/24* (2006.01)
*C01B 3/02* (2006.01)
*C01B 3/24* (2006.01)

(52) U.S. Cl. ............. 48/210; 48/61; 48/197 R; 423/644; 423/648.1; 423/650

(58) Field of Classification Search ................ 48/197 R, 48/61, 210; 423/644, 648.1, 650
See application file for complete search history.

(56) References Cited

U.S. PATENT DOCUMENTS

| | | | | |
|---|---|---|---|---|
| 4,872,886 | A * | 10/1989 | Henley et al. | 48/197 R |
| 5,134,944 | A * | 8/1992 | Keller et al. | 110/234 |
| 5,281,349 | A | 1/1994 | Okazaki et al. | |
| 5,713,312 | A | 2/1998 | Waryasz | |
| 6,117,916 | A * | 9/2000 | Allam et al. | 518/702 |
| 6,312,482 | B1 | 11/2001 | James et al. | |
| 6,409,798 | B1 * | 6/2002 | Nieminen et al. | 75/403 |
| 6,610,112 | B1 | 8/2003 | Klock et al. | |
| 6,824,575 | B1 | 11/2004 | Otomo et al. | |
| 2004/0055216 | A1 * | 3/2004 | Berger et al. | 48/197 FM |
| 2006/0233687 | A1 * | 10/2006 | Hojlund Nielsen | 423/210 |

OTHER PUBLICATIONS

Booras, George et al., "Pulverized Coal and IGCC Plant Cost and Performance Estimates," Gasification Technologies, Oct. 3-6, 2004, pp. 1-22, Washington, DC.
Dr. Breton, David L., "Improved Performance of the 'Destec' Gasifier," Gasification Technologies Conference, 1999, pp. 1-12, Houston, Texas.
Camozzi, Dario et al., "ENI Refining & Marketing Sannazzaro Gasification Plant Project Update and Start Up Experience," Gasification Technologies, 2006, pp. 1-14, Washington, DC.
Pinkston, Tom et al., "Orlando Gasification Project: Demonstration of a 285 MW Coal-Based Transport Gasifier," The $31^{st}$ International Technical Conference on Coal Utilization & Fuel Systems, May 21-25, 2006, pp. 1-9.
Worthington, Barry K., "Wabash Completes Fourth Year of Commercial Operation," Clean Coal Today, Spring 2000, pp. 2-15, DOE/FE-0215P-39 Issue No. 39, Office of Fossil Energy, U.S. Department of Energy, Washington, DC.

* cited by examiner

*Primary Examiner* — Matthew Merkling
(74) *Attorney, Agent, or Firm* — KBR IP Legal Dept.

(57) ABSTRACT

Systems and processes for producing syngas and power therefrom are provided. One or more feedstocks and one or more oxidants can be combined in a fluidized reaction zone operated at a temperature from 550° C. to 1,050° C. to provide a syngas. Heat can be indirectly exchanged in a first zone from the syngas to a condensate to provide steam. Heat can also be indirectly exchanged in a second zone from the syngas to the steam to provide superheated steam. Heat can then be indirectly exchanged in a third zone from the syngas to provide a cooled syngas and the condensate for the first zone. At least a portion of the superheated steam can be directly supplied to one or more steam turbines to produce power.

24 Claims, 5 Drawing Sheets

EFFICIENCY OF GASIFICATION PROCESSES

BACKGROUND

1. Field

The present embodiments generally relate to the gasification of hydrocarbons. More particularly, embodiments of the present invention relate to recovering heat from syngas and power produced therefrom.

2. Description of the Related Art

Gasification is a high-temperature process usually conducted at elevated pressure to convert carbon-containing materials into carbon monoxide and hydrogen gas. Since this gas is often used for the synthesis of chemicals or synthetic hydrocarbon fuels, the gas is often referred to as "synthesis gas" or "syngas." Syngas can be used as a fuel to generate electricity or steam, as a source of hydrogen, and as a raw material in the production of fuels, chemicals, fertilizers, and industrial gases.

There are three basic gasifier types: fixed bed, fluidized bed and entrained flow. The fixed bed gasifier is operated at relatively low outlet temperature of about 425° C. (797° F.) to about 600° C. (1,112° F.) and requires a lesser amount of oxygen compared to the other two types of gasifiers; however, the product syngas contains substantial unconverted methane, and by-product tars and oils. The fluidized bed gasifier operates at more moderate outlet temperatures of about 900° C. (1,652° F.) to about 1,050° C. (1,922° F.) and requires a greater amount of oxygen than a comparable fixed bed gasifier. While the syngas from a fluidized bed gasifier is of higher purity, the carbon conversion is lower than a comparable entrained flow gasifier which operates at much higher temperatures of about 1,250° C. (2,282° F.) to about 1,600° C. (2,912° F.) and requires significantly higher energy input, but from which syngas of the highest purity can be obtained.

The high temperature in the entrained gasifiers and in the lower zones of certain fixed bed gasifiers converts the inorganic materials in the feed into a molten vitrified material which solidifies when removed from the gasifier, producing a material resembling coarse sand and generally referred to as slag. Fluid bed gasifiers produce dry ash which is not vitrified but only consolidated or agglomerated. Depending on the gasifier, it is desirable either to remove ash at lower temperatures (non-slagging gasifiers) or as a low viscosity liquid at high temperatures (slagging gasifiers). This inert slag or ash has a variety of uses in the construction and building industries.

The raw syngas can be treated using proven commercial technologies to remove trace elements and other impurities for recovery or recycle to the gasifier. Sulfur can be recovered as marketable elemental sulfur or sulfuric acid. In order to remove the contaminants from the syngas, the most economically feasible means is to cool the syngas first. One conventional technique used to cool the syngas is direct cooling, in which a quench fluid is introduced to the syngas. Another technique is indirect cooling where saturated steam is generated. This saturated steam is generally further heated, requiring additional fuel or other source of heat, in a heat recovery system to generate superheated steam for use in generating power in a steam turbine.

There is a need, therefore, for more efficient systems and methods for utilizing heat generated in producing syngas.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

Systems and processes for producing syngas and power therefrom are provided. In one or more embodiments, one or more feedstocks and one or more oxidants can be combined in a fluidized reaction zone. The reaction zone can be heated to a temperature of from about 550° C. to about 1,050° C. to provide a syngas. In one or more embodiments, heat can be indirectly exchanged in a first zone from the syngas to a condensate to provide steam and a cooled syngas having a first temperature. In one or more embodiments, heat can be indirectly exchanged in a second zone from the syngas cooled in the first zone to at least a portion of the steam produced in the first zone to provide superheated steam and a cooled syngas having a second temperature. In one or more embodiments, heat can be indirectly exchanged in a third zone from the syngas cooled in the second zone to a heat transfer medium consisting essentially of water to provide the condensate and a cooled syngas having a third temperature. In one or more embodiments, at least a portion of the superheated steam produced in the third zone can be supplied to one or more steam turbines to produce power. In one or more embodiments, at least a portion of the condensate provided in the third zone can be supplied to the first zone for indirect heat exchange with the syngas therein.

Figure 1:
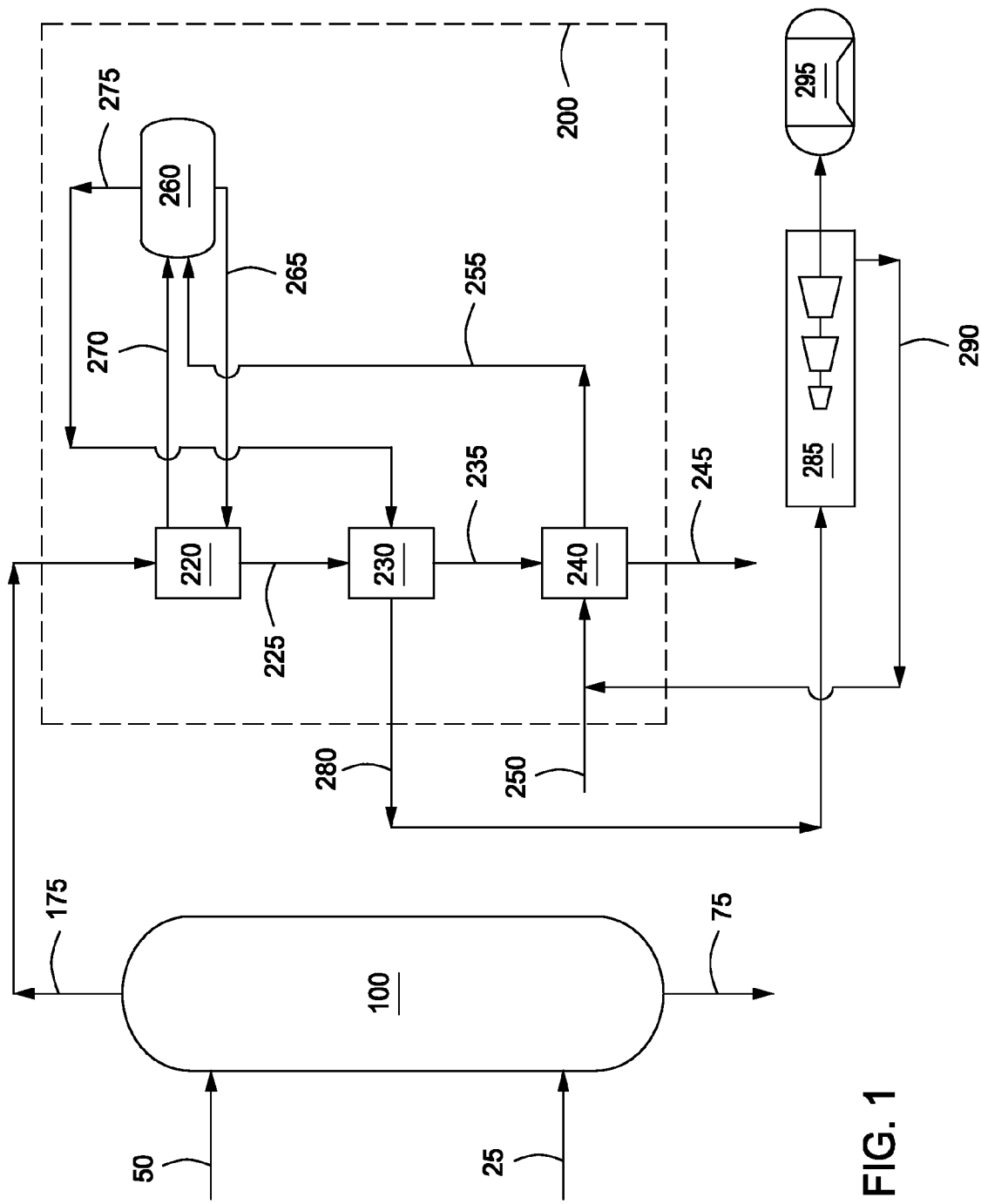
FIG. 1 depicts an illustrative system for recovering heat from a syngas and producing power therefrom, according to one or more embodiments described.

With reference to the figures, FIG. 1 depicts an illustrative system for recovering heat from a syngas and producing power therefrom, according to one or more embodiments. The system can include one or more gasifiers 100, one or more syngas coolers 200, one or more steam turbines 285, and one or more generators 295. One or more feedstocks via line 50 and one or more oxidants via line 25 can be introduced to the one or more gasifiers 100 to produce a raw syngas via line 175. The raw syngas in line 175 can exit the gasifier at a temperature of from about 575° C. (1,067° F.) to about 1,050° C. (1,922° F.). The raw syngas via line 175 can be cooled using the one or more syngas coolers 200.

The cooler 200 can include three or more heat exchangers or heat exchanging zones 220, 230, and 240 (three are shown) arranged in series. The raw syngas via line 175 can be cooled by indirect heat exchange in the first heat exchanger ("first zone") 220 to a temperature of from about 260° C. (500° F.) to about 820° C. (1,508° F.). The cooled raw syngas exiting the first heat exchanger 220 via line 225 can be further cooled by indirect heat exchange in the second heat exchanger ("second zone") 230 to a temperature of from about 260° C. (500° F.) to about 704° C. (1,299° F.). The cooled raw syngas exiting the second heat exchanger 230 via line 235 can be further cooled by indirect heat exchange in the third heat exchanger ("third zone") 240 to a temperature of from about 260° C. (500° F.) to about 427° C. (801° F.).

The raw syngas via line 175 can be cooled using a heat transfer medium. The heat transfer medium can be process water, boiler feed water, or the like. The heat transfer medium via line 250 can be introduced to the syngas cooler 200. Heat from the raw syngas can be indirectly transferred to the heat transfer medium to provide superheated or high pressure superheated steam which can be recovered via line 280. The superheated or high pressure superheated steam via line 280 can be used to power one or more steam turbines 285 to drive a directly coupled electric generator 295. The condensate recovered from the steam turbines 285 via line 290 can be recycled as boiler feed water to cool the syngas and produce steam.

The boiler feed water via line 250 can be heated within the third heat exchanger ("economizer") 240 to provide the cooled syngas via line 245 and a condensate via line 255. The condensate via line 255 can be saturated or substantially saturated at the process conditions. The condensate 255 can be introduced ("flashed") to one or more steam drums or separators 260 to separate the gas phase ("steam") from the liquid phase ("condensate"). Steam via line 275 can be introduced to the second heat exchanger ("superheater") 230 and heated against the incoming syngas via line 225 to provide superheated or high pressure superheated steam via line 280.

The superheated or high pressure superheated steam via line 280 from the syngas cooler 200 can have a temperature of about 400° C. (752° F.) or more, 425° C. (797° F.) or more, 450° C. (842° F.) or more, 475° C. (887° F.) or more, 500° C. (932° F.) or more, or 550° C. (1,022° F.) or more. The superheated or high pressure superheated steam via line 280 can have a pressure of about 5,170 kPa (735 psig) or more, 5,500 kPa (783 psig) or more, 5,960 kPa (850 psig) or more, 6,310 kPa (901 psig) or more, 6,650 kPa (950 psig) or more, 6,700 kPa (957 psig) or more, 7,340 kPa (1,050 psig) or more, or 7,720 kPa (1,105 psig) or more.

The condensate via line 265 from the separator 260 can be introduced to the first heat exchanger ("boiler") 220 and heated against the syngas via line 175 thereby producing steam which can be introduced to the separator 260 via line 270. As mentioned above, the steam returned to the separator 260 via line 270 can exit via line 275 for superheating in the second heat exchanger 230 to provide superheated or high pressure superheated steam via line 280 for use in the one or more steam turbines 285.

Any one or all of the heat exchangers 220, 230, 240 (three are shown) can be shell-and-tube type heat exchangers. The raw syngas in line 175 can be supplied in series to the shell-side or tube-side of the first heat exchanger 220, second heat exchanger 230, and third heat exchanger 240. The heat transfer medium can pass through either the shell-side or tube-side, depending on which side the raw syngas is introduced. In one or more embodiments, the raw syngas in line 175 can be supplied in parallel (not shown) to shell-side or tube-side of the first heat exchanger 220, second heat exchanger 230, and third heat exchanger 240 and the heat transfer medium can pass serially through either the shell-side or tube-side, depending on which side the raw syngas is introduced. Make-up heat transfer medium can be added via line 250.

Figure 2:
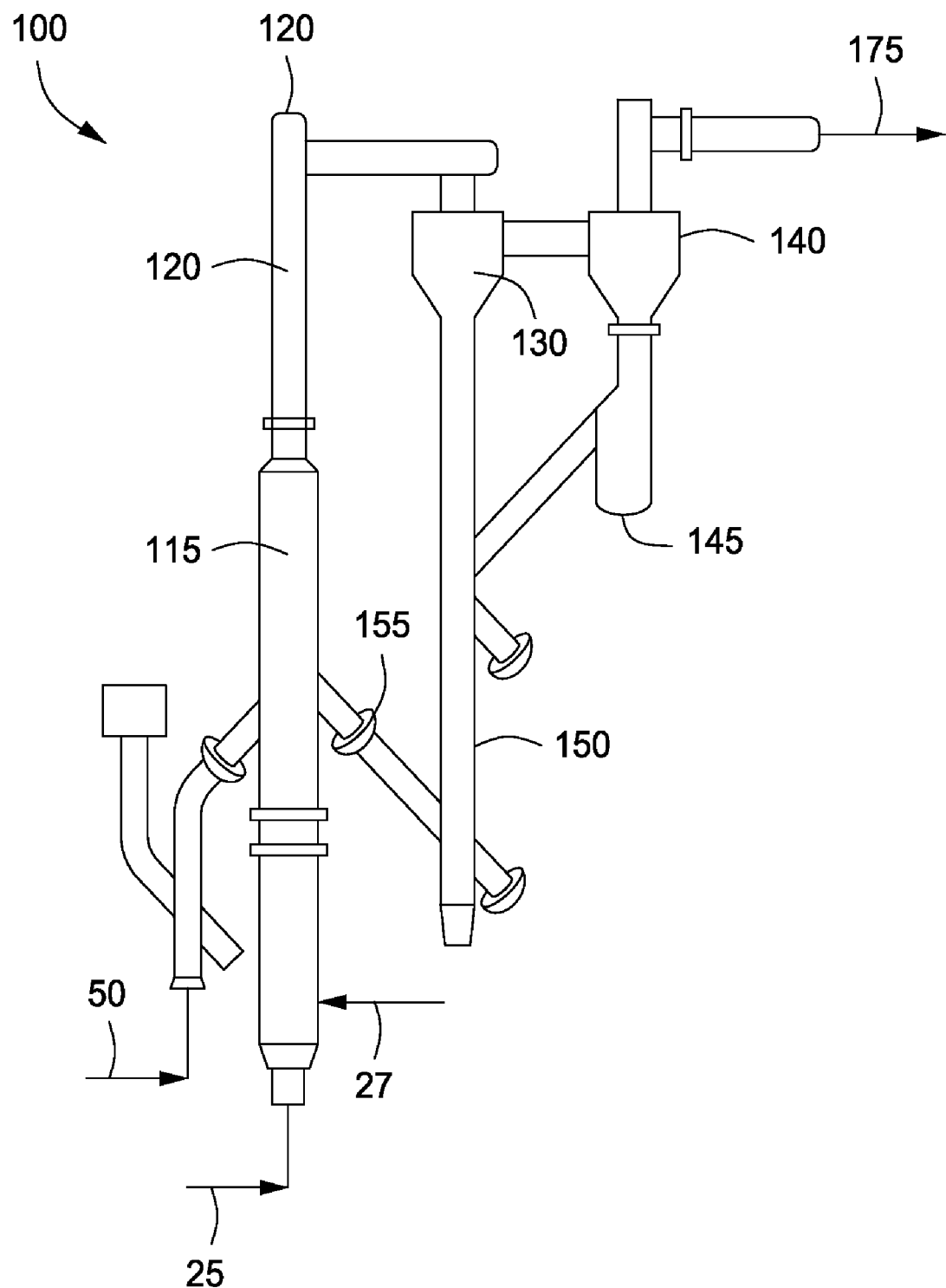
FIG. 2 depicts an illustrative gasifier according to one or more embodiments described.

FIG. 2 depicts an illustrative gasifier 100, according to one or more embodiments. The gasifier 100 can include a single reactor train or two or more reactor trains arranged in series or parallel. Each reactor train can include one or more mixing zones 115, risers 120, and disengagers 130, 140. Each reactor train can be configured independent from the others or configured where any of the one or more mixing zones 115, risers 120, disengagers 130, 140 can be shared. For simplicity and ease of description, embodiments of the gasifier 100 will be further described in the context of a single reactor train as depicted in FIG. 2.

The one or more feedstocks via line 25 and one or more oxidants via line 50 can be combined in the mixing zone 115 to provide a gas mixture. In one or more embodiments, steam can be introduced via line 27 to the mixing zone 115. The feedstock and oxidant can be introduced separately, as shown, to the mixing zone 115 or mixed prior to introduction to the mixing zone (not shown). The feedstock and oxidant can be introduced sequentially into the gasifier 100. The feedstock and oxidant can be introduced simultaneously into the gasifier 100. In one or more embodiments, the steam via line 27 can be mixed with the feedstock, oxidant, or both. Feed (i.e. introduction of the feedstock and oxidant) to the gasifier 100 can be continuous or intermittent depending on desired product types and grades. The one or more oxidants can be introduced at the bottom of the mixing zone 115 to increase the temperature within the mixing zone 115 and riser 120 by combusting any carbon contained within the recirculated particulates (not shown) to form an ash ("char").

The gasifier 100 can be operated in a temperature range sufficient to not melt the ash, such as from about 550° C. (1,022° F.) to about 1,050° C. (1,922° F.), or from about 275° C. (527° F.) to about 950° C. (1,742° F.). Heat can be supplied by burning the carbon in the recirculated solids in the lower part of the mixing zone 115 before recirculated solids contact the entering feedstock. Startup can be initiated by bringing the mixing zone 115 to a temperature from about 500° C. (932° F.) to about 650° C. (1,202° F.) and optionally by feeding coke breeze or the equivalent to the mixing zone 115 to further increase the temperature of the mixing zone 115 to about 900° C. (1,652° F.).

The operating temperature of the gasifier 100 can be controlled by the recirculation rate and residence time of the solids within the riser 120; by reducing the temperature of the ash prior to recycle (not shown) to the mixing zone 115; by the addition of steam to the mixing zone 115; and/or by the addition of oxidant to the mixing zone 115. The recirculating solids also can serve to rapidly heat the incoming feedstock which also minimizes tar formation.

The residence time and temperature in the mixing zone 115 and the riser 120 can be sufficient for water-gas shift reaction to reach equilibrium. The residence time of the feedstock in the mixing zone 115 can be greater than about 2 seconds. The residence time of the feedstock in the mixing zone 115 can be greater than about 5 seconds. The residence time of the feedstock in the mixing zone 115 can be greater than about 10 seconds.

The mixing zone 115 can be operated at pressures of from about 100 kPa (0 psig) to about 4,600 kPa (653 psig) to increase thermal output per unit reactor cross-sectional area and enhance energy output in any subsequent power cycle. The mixing zone 115 can be operated at pressures from about 650 kPa (80 psig) to about 2,550 kPa (355 psig). The mixing zone 115 can be operated at pressures from about 650 kPa (80 psig) to about 3,200 kPa (450 psig). The mixing zone 115 can be operated at pressures from about 650 kPa (80 psig) to about 3,950 kPa (559 psig).

The operating temperature of the mixing zone 115 can range from about 250° C. (482° F.), 400° C. (752° F.) or 550° C. (1,022° F.) to about 650° C. (1,202° F.), 825° C. (1,517° F.), or 1,000° C. (1,832° F.). The operating temperature of the mixing zone 320 can range from about 350° C. (662° F.) to about 950° C. (1,742° F.), about 475° C. (887° F.) to about 900° C. (1,652° F.), or about 650° C. (1,202° F.) to about 875° C. (1,607° F.).

The gas mixture can flow through the mixing zone 115 into the riser 120 where additional residence time allows the char gasification, steam/methane reforming, tar cracking, and/or water-gas shift reactions to occur. The riser 120 can operate at a higher temperature than the mixing zone 115, and can have a smaller diameter than the mixing zone 115. The superficial gas velocity in the riser 120 can range from about 3 m/s (10 ft/s) to about 27 m/s (90 ft/s), or from about 6 m/s (20 ft/s) to about 24 m/s (80 ft/s), or from about 9 m/s (30 ft/s) to about 21 m/s (70 ft/s), or from about 9 m/s (30 ft/s) to about 12 m/s (40 ft/s), or from about 11 m/s (35 ft/s) to about 18 m/s (60 ft/s). Suitable temperatures in the riser 120 can range from about 320° C. (608° F.) to about 1,100° C. (2,012° F.).

The gas mixture can exit the riser 120 and enter the disengagers 130, 140 where the larger particulates can be separated from the gas and recycled back to the mixing zone 115 via one or more conduits, including, but not limited to, a standpipe 150, and/or j-leg 155. The j-leg 155 can include a non-mechanical "j-valve" to increase the effective solids residence time, increase the carbon conversion, and minimize aeration requirements for recycling solids to the mixing zone 115. The disengagers 130, 140 can be cyclones. One or more particulate transfer devices 145, such as one or more loop seals, can be located downstream of the disengagers 130, 140 to collect separated particulates. Any entrained or residual particulates in the raw syngas stream 175 can be removed using the one or more particulate removal systems 300 (shown in FIG. 2).

The average particle diameter size of the feedstock can be used as a control variable to optimize particulate density of the solids recycled to the mixing zone via the standpipe 150. The feedstock particle size can be varied to optimize the particulate mass circulation rate, and to improve the flow characteristics of the gas mixture within the mixing zone 115 and riser 120.

Steam via line 27 can be supplied to the gasifier 100 to control the hydrogen to carbon monoxide ratio ($H_2$:CO) within the gasifier 100. Since the outlet temperature of the gasifier 100 can be proportionately less than comparable gasifiers (i.e. slag type), the amount of thermal heat versus chemical heat in the syngas can be comparably less in the gasifier 100. Therefore, steam can be used to adjust by shift the $H_2$:CO ratio with a smaller energy penalty than other entrained flow gasifiers operating at higher temperatures. Because of the reduced operating temperature within the gasifier (i.e. less than 1,600° C. (2,912° F.)), less energy is consumed to control and optimize the $H_2$:CO ratio, thus the production of hydrogen can be increased without a commensurate increase in steam demand within the gasifier 100. For example, the syngas leaving the gasifier 100 can have a $H_2$:CO of at least 0.2. In one or more embodiments, the $H_2$:CO ratio can be at least 0.5. The $H_2$:CO ratio can be about 0.25 to about 2.5. The $H_2$:CO ratio can be about 0.4 to about 2.0. The $H_2$:CO ratio can be about 0.5 to about 1.5. The $H_2$:CO ratio can be about 0.8 to about 1.0.

The raw syngas can exit the one or more gasifiers 100 via line 175. The raw syngas in line 175 can contain 85% or more carbon monoxide and hydrogen with the balance being primarily carbon dioxide and methane. The raw syngas in line 175 can contain 90% or more carbon monoxide and hydrogen, 95% or more carbon monoxide and hydrogen, 97% or more carbon monoxide and hydrogen, or 99% or more carbon monoxide and hydrogen. The carbon monoxide content of the raw syngas in line 175 can range from a low of about 10 vol %, 20 vol %, or 30 vol % to a high of about 50 vol %, 70 vol % or 85 vol %. The carbon monoxide content of the raw syngas in line 175 can range from a low of about 15 vol %, 25 vol %, or 35 vol % to a high of about 65 vol %, 75 vol % or 85 vol %. The hydrogen content of the raw syngas in line 175 can range from a low of about 1 vol %, 5 vol %, or 10 vol % to a high of about 30 vol %, 40 vol % or 50 vol %. The hydrogen content of the raw syngas in line 175 can range from about 20 vol % to about 30 vol %.

The raw syngas in line 175 can contain less than 25 vol % of combined nitrogen, methane, carbon dioxide, water, hydrogen sulfide, and hydrogen chloride. The raw syngas in line 175 can contain less than 20 vol % of combined nitrogen, methane, carbon dioxide, water, hydrogen sulfide, and hydrogen chloride. The raw syngas in line 175 can contain less than 15 vol % of combined nitrogen, methane, carbon dioxide, water, hydrogen sulfide, and hydrogen chloride. The raw syngas in line 175 can contain less than 10 vol % of combined nitrogen, methane, carbon dioxide, water, hydrogen sulfide, and hydrogen chloride. The raw syngas in line 175 can contain less than 5 vol % of combined nitrogen, methane, carbon dioxide, water, hydrogen sulfide, and hydrogen chloride.

The carbon dioxide content of the raw syngas in line 175 can be about 20 vol % or less, 15 vol % or less, 10 vol % or less, 5 vol % or less, 3 vol % or less, 2 vol % or less, or 1 vol % or less. The methane content of the raw syngas in line 175 can be about 15 vol % or less, 10 vol % or less, 5 vol % or less, 3 vol % or less, 2 vol % or less, or 1 vol % or less. The water content of the raw syngas in line 175 can be about 40 vol % or less, 30 vol % or less, 25 vol % or less, 20 vol % or less, 15 vol % or less, 10 vol % or less, 5 vol % or less, 3 vol % or less, 2 vol % or less, or 1 vol % or less. The raw syngas in line 175 can be nitrogen-free or essentially nitrogen-free, e.g. containing 0.5 vol % nitrogen or less.

The syngas in line 175 can have a heating value, corrected for heat losses and dilution effects, of about 1,863 kJ/m$^3$ (50 Btu/scf) to about 2,794 kJ/m$^3$ (75 Btu/scf); about 1,863 kJ/m$^3$ (50 Btu/scf) to about 3,726 kJ/m$^3$ (100 Btu/scf); about 1,863 kJ/m$^3$ (50 Btu/scf) to about 4,098 kJ/m$^3$ (110 Btu/scf); about 1,863 kJ/m$^3$ (50 Btu/scf) to about 5,516 kJ/m$^3$ (140 Btu/scf); about 1,863 kJ/m$^3$ (50 Btu/scf) to about 6,707 kJ/m$^3$ (180 Btu/scf); about 1,863 kJ/m$^3$ (50 Btu/scf) to about 7,452 kJ/m$^3$ (200 Btu/scf); about 1,863 kJ/m$^3$ (50 Btu/scf) to about 9,315 kJ/m$^3$ (250 Btu/scf); or about 1,863 kJ/m$^3$ (50 Btu/scf) to about 10,246 kJ/m$^3$ (275 Btu/scf).

The type and amount of oxidant introduced to the gasifier 100 can determine the composition and physical properties of the syngas and hence, the downstream products made therefrom. The one or more oxidants via line 25 can include but are not limited to, air; oxygen; essentially oxygen; oxygen-enriched air; mixtures of oxygen and air; mixtures of oxygen and inert gas such as nitrogen and argon; and the like. The oxidant can contain about 65% by volume ("vol %") oxygen or more, or about 70 vol % oxygen or more, or about 75 vol % oxygen or more, or about 80 vol % oxygen or more, or about 85 vol % oxygen or more, or about 90 vol % oxygen or more, or about 95 vol % oxygen or more, or about 99 vol % oxygen or more. As used herein, the term "essentially oxygen" refers to an oxygen feed containing 51 vol % oxygen or more. As used herein, the term "oxygen-enriched air" refers to air containing 21 vol % oxygen or more. Oxygen-enriched air can be obtained, for example, from cryogenic distillation of air, pressure swing adsorption, membrane separation, or any combination thereof. In one or more embodiments, the oxidant introduced via line 25 can be nitrogen-free or essentially nitrogen-free. By "essentially nitrogen-free," it is meant that the oxidant in line 25 contains about 5 vol % nitrogen or less, 4 vol % nitrogen or less, 3 vol % nitrogen or less, 2 vol % nitrogen or less, or 1 vol % nitrogen or less.

The one or more oxidants can be introduced into the gasifier 100 at a rate suitable to control the temperature within the gasifier 100. The one or more oxidants can be sub-stoichiometric air wherein the molar ratio of oxygen to carbon can be maintained at a sub-stoichiometric concentration to favor the formation of carbon monoxide over carbon dioxide in the gasifier 100. The oxygen supplied via the oxidant to the gasifier 100 can be less than five percent of the stoichiometric amount of oxygen required for complete combustion of all the carbon supplied to the gasifier 100. Excess oxygen and steam in the gasifier 100 can be consumed by the recirculating solids, which can stabilize the temperature of the gasifier 100 during operation and periods of feed interruption if any.

The term "feedstock" as used herein refers to a carbonaceous material, whether solid, liquid, gas, or a combination thereof. For example, the feedstock can include one or more carbonaceous materials (i.e. carbon-containing materials). The carbonaceous materials can include but are not limited to, biomass (e.g., plant and/or animal matter or plant and/or animal derived matter); coal (e.g., high-sodium and low-sodium lignite, lignite, subbituminous, and/or anthracite); oil shale; coke; tar; asphaltenes; low ash or no ash polymers; hydrocarbon-based polymeric materials; biomass derived material; or by-product derived from manufacturing operations. The hydrocarbon-based polymeric materials can include, for example, thermoplastics, elastomers, rubbers, including polypropylenes, polyethylenes, polystyrenes, including other polyolefins, homo polymers, copolymers, block copolymers, and blends thereof; PET (polyethylene terephthalate), poly blends, other polyolefins, poly-hydrocarbons containing oxygen; heavy hydrocarbon sludge and bottoms products from petroleum refineries and petrochemical plants such as hydrocarbon waxes, blends thereof, derivatives thereof, and combinations thereof.

The feedstock can include a mixture or combination of two or more carbonaceous materials. For example, the feedstock can include a mixture or combination of two or more low ash or no ash polymers, biomass derived materials, or by-products derived from manufacturing operations. The feedstock can include one or more carbonaceous materials combined with one or more discarded consumer products, such as carpet and/or plastic automotive parts/components including bumpers and dashboards. Such discarded consumer products are preferably suitably reduced in size to fit within the gasifier 100. The feedstock can include one or more recycled plastics such as polypropylene, polyethylene, polystyrene, derivatives thereof, blends thereof, or any combination thereof. Accordingly, the process can be useful for accommodating mandates for proper disposal of previously manufactured materials.

In one or more embodiments, one or more sorbents can also be added to the gasifier 100. The one or more sorbents can be added to capture contaminants from the syngas, such as sodium vapor in the gas phase within the gasifier 100. The one or more sorbents can be added to scavenge oxygen at a rate and level sufficient to delay or prevent the oxygen from reaching a concentration that can result in undesirable side reactions with hydrogen (e.g. water) from the feedstock within the gasifier 100. The one or more sorbents can be mixed or otherwise added to the one or more feedstocks. The one or more sorbents can be used to dust or coat feedstock particles in the gasifier to reduce the tendency for the particles to agglomerate. The one or more sorbents can be ground to an average particle size of about 5 microns to about 100 microns, or about 10 microns to about 75 microns. Illustrative sorbents can include but are not limited to, carbon rich ash, limestone, dolomite, and coke breeze. Residual sulfur released from the feedstock can be captured by native calcium in the feed or by a calcium-based sorbent to form calcium sulfide.

The feedstock in line 25 can be a dry feed or conveyed to the gasifier 100 as a slurry or suspension. In one or more embodiments, the feedstock can be dried, for example to 18% moisture, and then pulverized by milling units such as one or more parallel bowl mills prior to feeding to the gasifier 100. The feedstock can have an average particle diameter size of from about 50 microns to about 500 microns, or from about 50 microns to about 400 microns. The average particle diameter size of the feedstock can range from about 150 microns to about 450 microns, or from about 250 microns to about 400 microns.

Figure 3:
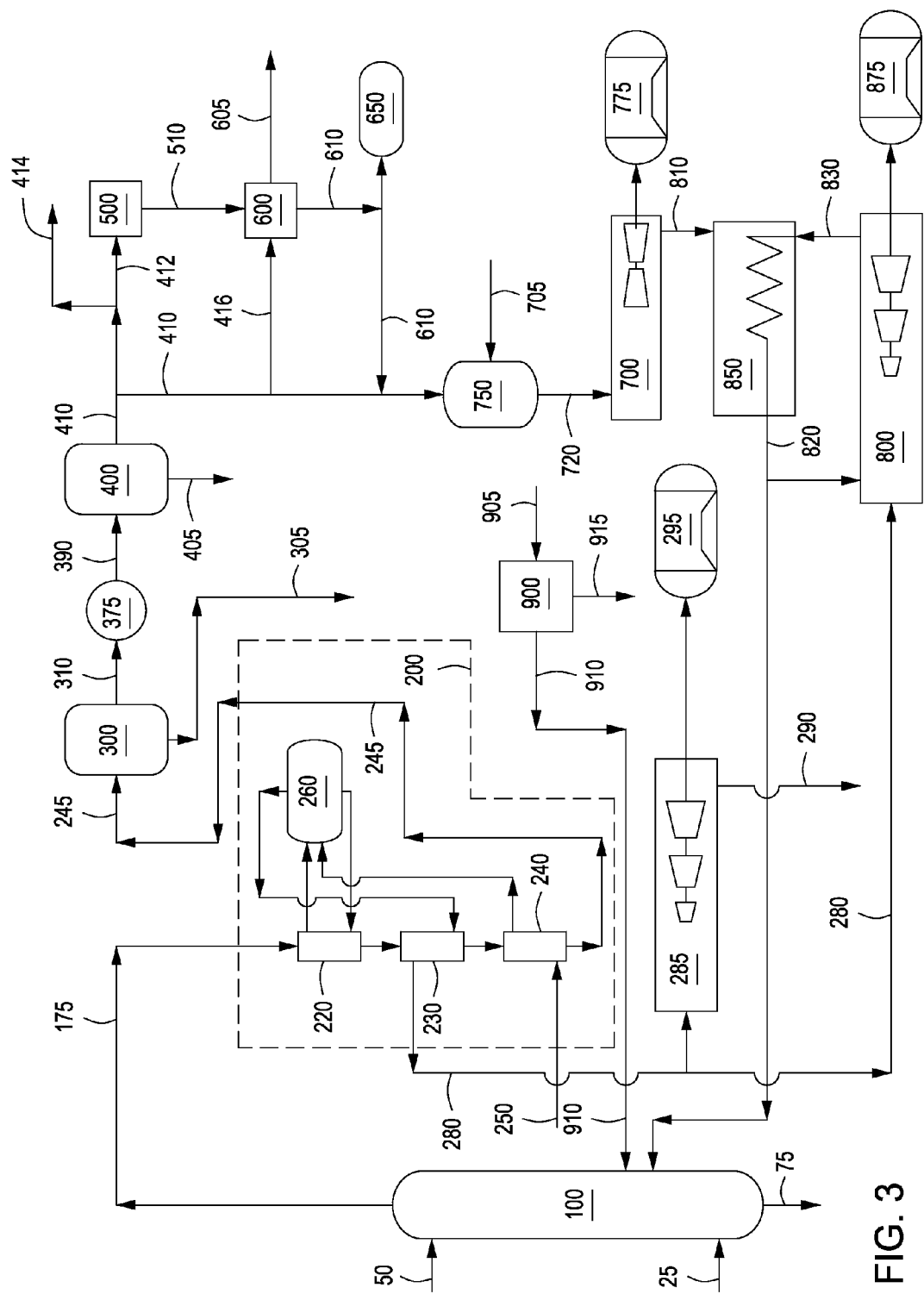
FIG. 3 depicts an illustrative gasification system utilizing the syngas heat recovery system depicted in FIG. 1, according to one or more embodiments described.

FIG. 3 depicts an illustrative gasification system utilizing the syngas heat recovery system depicted in FIG. 1, according to one or more embodiments. The gasification system can include the one or more gasifiers 100 and syngas coolers 200 described and discussed above with reference to FIG. 1. The system can further include one or more particulate removal systems 300 and gas purification systems 400 to provide a syngas ("treated syngas") via line 410. In one or more embodiments, the gasification system can also include one or more gas converters 500 to produce one or more Fischer-Tropsch products, chemicals, and/or feedstocks, derivatives thereof, and/or combinations thereof, including ammonia and methanol. In one or more embodiments, the gasification system can also include one or more hydrogen separators 600, fuel cells 650, combustors 750, gas turbines 700, steam turbines 285, 800, heat recovery systems or waste heat boilers 850, and generators 295, 775, and 875 to produce fuel, power, steam and/or energy. In one or more embodiments, the gasification system can also include one or more air separation units ("ASU") 900 for the production of essentially nitrogen-free syngas.

The cooled raw syngas via line 245 can be introduced to the one or more particulate removal systems 300 to partially or completely remove particulates to provide separated particulates via line 305 and a separated syngas via line 310. Although not shown, in one or more embodiments, the one or more particulate removal systems 300 can optionally be used to partially or completely remove particulates from the raw syngas in line 175 before cooling. For example, the raw syngas via line 175 can be introduced directly to the particulate removal system 300, resulting in hot gas particulate removal (e.g. from about 550° C. (1,022° F.) to about 1,050° C. (1,922° F.)). Although not shown, in one or more embodiments, two particulate removal systems 300 can be used, for example one particulate removal system 300 can be upstream of the cooler 200 and one particulate removal system 300 can be downstream of the cooler 200.

The one or more particulate removal systems 300 can include one or more separation devices such as conventional disengagers and/or cyclones (not shown). Particulate control devices ("PCD") capable of providing an outlet particulate concentration below the detectable limit of about 0.1 ppmw can also be used. Illustrative PCDs can include but are not limited to, sintered metal filters, metal filter candles, and/or ceramic filter candles (for example, iron aluminide filter material).

The solid particulates via line 305 can be purged from the system, or recycled to the gasifier 200 (not shown). The separated syngas in line 310 can be further cooled using one or more coolers ("secondary coolers") 375 to provide a separated syngas via line 390 cooler than the cooled raw syngas in line 310. The separated syngas in line 390 can have a temperature of about 350° C. (662° F.) or less, such as about 150° C. (302° F.) to about 300° C. (572° F.). The cooled, separated syngas in line 390 can be treated within one or more gas purification systems 400 to remove contaminants providing a waste gas via line 405, and a treated syngas via line 410. The one or more gas purification systems 400 can include systems, processes, or devices to remove sulfur and/or sulfur containing compounds in the separated syngas in line 390. Illustrative catalytic gas purification systems 400 can include, but are not limited to, systems using zinc titanate, zinc ferrite, tin oxide, zinc oxide, iron oxide, copper oxide, cerium oxide or mixtures thereof. Illustrative process-based gas purification systems 400 can include, but are not limited to, the Selexol™ process, the Rectisol® process, the CrystaSulf® process, and the Sulfinol® Gas Treatment Process.

One or more amine solvents such as methyl-diethanolamine (MDEA) can be used to remove any acid gas from the syngas in line 390. Physical solvents such as Selexol™ (dimethyl ethers of polyethylene glycol) or Rectisol® (cold methanol), can also be used. If the syngas in line 390 contains carbonyl sulfide (COS), the carbonyl sulfide can be converted by hydrolysis to hydrogen sulfide ("$H_2S$") by reaction with water over a catalyst and then absorbed using the methods described above. If the syngas in line 390 contains mercury, the mercury can be removed using a bed of sulfur-impregnated activated carbon.

A cobalt-molybdenum ("Co—Mo") catalyst can be incorporated into the one or more purification units 400 to perform a sour shift conversion of the syngas. The Co—Mo catalyst can operate at a temperature of about 290° C. (550° F.) in presence of $H_2S$, such as about 100 ppmw $H_2S$. If Co—Mo catalyst is used to perform a sour shift, subsequent downstream removal of sulfur can be accomplished using any of the above described sulfur removal methods and/or techniques.

At least a portion of the treated syngas via line 410 from the gas purification system 400 can be combusted to produce or generate power (e.g. electricity) and/or steam. The treated syngas in line 410 can be recovered via line 414 and sold as a commodity. The treated syngas in line 410 can be supplied to one or more gas converters 500 via line 412 to provide a converted syngas via line 510, which can include, but are not limited to, one or more Fischer-Tropsch products, ammonia, methanol, chemicals, and/or feedstocks, derivatives thereof, or combinations thereof. At least a portion of the treated syngas in line 410 can be sent to a hydrogen separator via line 416 to provide a hydrogen rich effluent via line 610 which can be used in hydrogenation processes, fuel cell energy processes, ammonia production, and/or as a fuel.

Still referring to FIG. 3, the one or more gas converters 500 can be used to convert the treated syngas in line 412 to provide a converted syngas via line 510. In one or more embodiments, at least one of the one or more gas converters 500 can include one or more shift converters to adjust the hydrogen ($H_2$) to carbon monoxide ratio ($H_2$:CO) of the syngas by converting carbon monoxide (CO) to carbon dioxide ($CO_2$). Within the one or more shift converters, a water-gas shift reaction can react at least a portion of the carbon monoxide in the treated syngas introduced via line 412 with water in the presence of a catalyst and/or a high temperature to produce hydrogen and carbon dioxide. The one or more shift converters can include, but are not limited to, single stage adiabatic fixed bed reactors; multiple-stage adiabatic fixed bed reactors with inter-stage cooling, steam generation or cold quench reactors; tubular fixed bed reactors with steam generation or cooling; fluidized bed reactors, or any combination thereof. A sorption enhanced water-gas shift ("SEWGS") process, utilizing a pressure swing adsorption unit having multiple fixed bed reactors packed with shift catalyst and high temperature (around 475° C. (887° F.)) carbon dioxide adsorbent, can be used. Various shift catalysts can be employed. Carbon monoxide can be separated from the treated syngas in line 410 and used for the production of chemicals, such as acetic acid, phosgene/isocyanates, formic acid, and propionic acid.

The shift converters can include two reactors arranged in series. A first reactor can be operated at high temperature from about 350° C. (662° F.) to about 400° C. (752° F.) to convert a majority of the CO present in the treated syngas introduced via line 412 to $CO_2$ at a relatively high reaction rate using a catalyst which can be, but is not limited to iron oxide, zinc ferrite, magnetite, chromium oxides, derivatives thereof, or any combination thereof. A second reactor can be operated at a relatively low temperature of about 150° C. (302° F.) to about 200° C. (392° F.) to complete the conversion of CO to $CO_2$ using a mixture of copper oxide and zinc oxide. The second reactor can use a catalyst that includes, but is not limited to copper, zinc, copper promoted chromium, derivatives thereof, or any combination thereof.

The one or more gas converters 500 can include one or more carbon dioxide recovery units. The carbon dioxide can be separated and/or recovered from the treated syngas introduced via line 412. In one or more embodiments, the carbon dioxide recovery unit can use propylene carbonate, other alkyl carbonates, dimethyl ethers of polyethylene glycol of two to twelve glycol units (Selexol™ process), n-methyl-pyrrolidone, sulfolane, the Sulfinol® Gas Treatment Process, monoethanolamine (MEA), diethanolamine (DEA), triethanolamine (TEA), potassium carbonate, methyldiethanolamine (MDEA), diglycolamine (DGA), diisopropanolamine (DIPA), hydrophobic zeolites, derivatives thereof, mixtures thereof, or any combination thereof to separate at least a portion of the carbon dioxide from the treated syngas.

The recovered carbon dioxide from the shift converters 500 can be used in a fuel recovery process to enhance the recovery of oil and gas. In an illustrative oil recovery process, carbon dioxide can be injected and flushed into an area beneath an existing well where "stranded" oil exists. The water and carbon dioxide removed with the crude oil can then be separated and recycled.

At least one of the one or more gas converters 500 can be used to produce one or more Fischer-Tropsch ("F-T") products, including refinery/petrochemical feedstocks, transportation fuels, synthetic crude oil, liquid fuels, lubricants, alpha olefins, waxes, and so on. The reaction can be carried out in any type reactor, e.g., fixed bed, moving bed, fluidized bed, slurry, bubbling bed, etc. using copper, ruthenium, iron or cobalt based catalysts, or combinations thereof, under conditions ranging from about 190° C. (374° F.) to about 450° C. (842° F.) depending on the reactor configuration. Additional reaction and catalyst details can be found in U.S. Patent Application No. 20050284797 and U.S. Pat. Nos. 5,621,155; 6,682,711; 6,331,575; 6,313,062; 6,284,807; 6,136,868; 4,568,663; 4,663,305; 5,348,982; 6,319,960; 6,124,367; 6,087,405; 5,945,459; 4,992,406; 6,117,814; 5,545,674 and 6,300,268.

The F-T products can be liquids which can be shipped to a refinery site for further chemically reacting and upgrading to a variety of products. Certain products, e.g. $C_4$-$C_5$ hydrocarbons, can be high quality paraffin solvents which, if desired, can be hydrotreated to remove olefin impurities, or employed without hydrotreating to produce a wide variety of wax products. Hydrocarbons, including $C_{16}$ and higher compounds can be upgraded by various hydroconversion reactions, e.g., hydrocracking, hydroisomerization catalytic dewaxing, isodewaxing, etc. or combinations thereof, to produce mid-distillates, diesel fuels, jet fuels, isoparaffinic solvents, lubricants, drilling oils suitable for use in drilling muds, technical and medicinal grade white oil, chemical raw materials, and various specialty products.

At least one of the one or more gas converters 500 can include one or more slurry bubble column reactors to produce one or more F-T products. The slurry bubble column reactors can operate at a temperature of less than 225° C. (437° F.) and from a vacuum to about 4,140 kPa (586 psig), or about 1,720 kPa (235 psig) to about 2,410 kPa (335 psig) using a cobalt catalyst promoted with rhenium and supported on titania having a Re:Co weight ratio in the range of about 0.01 to about 1 and containing from about 2% by weight to about 50% by weight cobalt. The catalyst within the slurry bubble column reactors can include, but is not limited to, a titania support impregnated with a salt of a catalytic copper or an Iron Group metal, a polyol or polyhydric alcohol and, optionally, a rhenium compound or salt. Examples of polyols or polyhydric alcohols include glycol, glycerol, derythritol, threitol, ribitol arabinitol, xylitol, allitol, dulcitol, gluciotol, sorbitol, and mannitol. The catalytic metal, copper or Iron Group metal as a concentrated aqueous salt solution, for example cobalt nitrate or cobalt acetate, can be combined with the polyol and optionally perrhenic acid while adjusting the amount of water to obtain 15% by weight cobalt in the solution and using optionally incipient wetness techniques to impregnate the catalyst onto rutile or anatase titania support, optionally spray-dried and calcined. This method reduces the need for rhenium promoter. Additional details can be found in U.S. Pat. Nos. 5,075,269 and 6,331,575.

In one or more embodiments, at least one of the one or more gas converters 500 can be used to produce methanol, alkyl formates, dimethyl ether, ammonia, acetic anhydride, acetic acid, methyl acetate, acetate esters, vinyl acetate and polymers, ketenes, formaldehyde, dimethyl ether, olefins, urea, derivatives thereof, and/or combinations thereof. For methanol production, for example, the Liquid Phase Methanol Process can be used (LPMeOH™). In this process, the carbon monoxide in the syngas in line 412 can be directly converted into methanol using a slurry bubble column reactor and catalyst in an inert hydrocarbon oil reaction medium which can conserve heat of reaction while idling during off-peak periods for a substantial amount of time while maintaining good catalyst activity. Additional details can be found in U.S. patent application Ser. No. 11/311,766 and prior published Heydorn, E. C., Street, B. T., and Kornosky, R. M., "Liquid Phase Methanol (LPMeOH™) Project Operational Experience," (Presented at the Gasification Technology Council Meeting in San Francisco on Oct. 4-7, 1998). Gas phase processes for producing methanol can also be used. For example, known processes using copper based catalysts, the Imperial Chemical Industries process, the Lurgi process and the Mitsubishi process can be used.

For ammonia production, at least one of the one or more gas converters 500 can be adapted to operate the Haber-Bosch process described in LeBanc et al in "Ammonia," Kirk-Othmer Encyclopedia of Chemical Technology, Volume 2, 3rd Edition, 1978, pp., 494-500. For alkyl formate production, such as for example, methyl formate, any of several processes wherein carbon monoxide and methanol are reacted in either the liquid or gaseous phase in the presence of an alkaline catalyst or alkali or alkaline earth metal methoxide catalyst can be used. Additional details can be found in U.S. Pat. Nos. 3,716,619; 3,816,513; and 4,216,339.

Although not shown, in one or more embodiments, at least a portion of the converted syngas via line 510 can be sold or upgraded using further downstream processes. At least a portion of the converted syngas via line 510 can be directed to the one or more hydrogen separators 600. At least a portion of the treated syngas in line 410 can bypass the one or more gas converters 500 described above, and can be fed directly to the one or more hydrogen separators 600 via line 416.

The one or more hydrogen separators 600 can include any system or device to selectively separate hydrogen from syngas to provide one or more purified hydrogen products and one or more waste effluents. The hydrogen separators 600 can provide a carbon dioxide product via line 605, and a hydrogen product via line 610. At least a portion of the hydrogen product via line 610 can be used as a feed to one or more fuel cells 650, and at least a portion of the hydrogen product via line 610 can be combined with the treated syngas in line 410 prior to use as a fuel in the one or more combustors 750. The hydrogen separators 600 can utilize pressure swing absorption, cryogenic distillation, and semi-permeable membranes. Suitable absorbents can include caustic soda, potassium carbonate or other inorganic bases, and/or alanolamines.

At least a portion of the treated syngas via line 410 can be combusted in one or more combustors 750 to provide a high pressure/high temperature exhaust gas via line 720. Air or other suitable oxidant via line 705 can be introduced to the one or more combustors 750. The exhaust gas via line 720 can be introduced to one or more gas turbines 700 to provide an exhaust gas via line 810 and mechanical shaft power to drive the one or more electric generators 775. The exhaust gas via line 810 can be introduced to one or more heat recovery systems 850 to provide steam via line 820.

The heat recovery system 850 can be a closed-loop heating system, e.g. a waste heat boiler, shell-and-tube heat exchanger, and the like, capable of exchanging heat between the higher temperature exhaust gas (via line 810) and the lower pressure steam (via line 830) to produce higher pressure steam (via line 820). The heat recovery system 850 can provide up to 10,350 kPa (1,487 psig), 550° C. (1,022° F.) superheat/reheat steam via line 820 without supplemental fuel.

At least a portion of the steam via line 820 can be introduced to one or more steam turbines 800 to provide mechanical shaft power to drive one or more electric generators 875. In one or more embodiments, at least a portion of the steam via line 820 can be introduced to the gasifier 100, and/or other auxiliary process equipment (not shown). In one or more embodiments, at least a portion of the steam via line 820 can be introduced to other auxiliary, steam consuming, process equipment (not shown) Lower pressure steam from the one or more steam turbines 800 can be recycled to the one or more heat recovery systems 850 via line 830. The steam via line 820 can be introduced to one or more steam turbines 800, heat recovery systems 850, gasifiers 100, or a combination thereof. The residual heat from the steam in line 830 can be rejected to a condensation system well known to those skilled in the art or sold to local steam consumers (not shown).

Pure oxygen, nearly pure oxygen, essentially oxygen, or oxygen-enriched air from the ASU 900 can be supplied to the gasifier 100 via line 910. The ASU 900 can provide a nitrogen-lean and oxygen-rich feed via line 910 to the one or more gasifiers 100, thereby minimizing the nitrogen concentration in the syngas provided via line 175. The use of a pure or nearly pure oxygen feed allows the gasifier 100 to produce a syngas via line 175 that can be essentially nitrogen-free, e.g. containing less than 0.5% nitrogen/argon. The ASU 900 can be a high-pressure, cryogenic type separator. Air can be introduced to the ASU 900 via line 905. The separated nitrogen via line 915 from the ASU can be added to a combustion turbine, as explained in more detail below or used as utility. The ASU 930 can provide from about 10%, about 30%, about 50%, about 70%, about 90%, or about 100% of the total oxidant fed to the gasifier 300.

Figure 4:
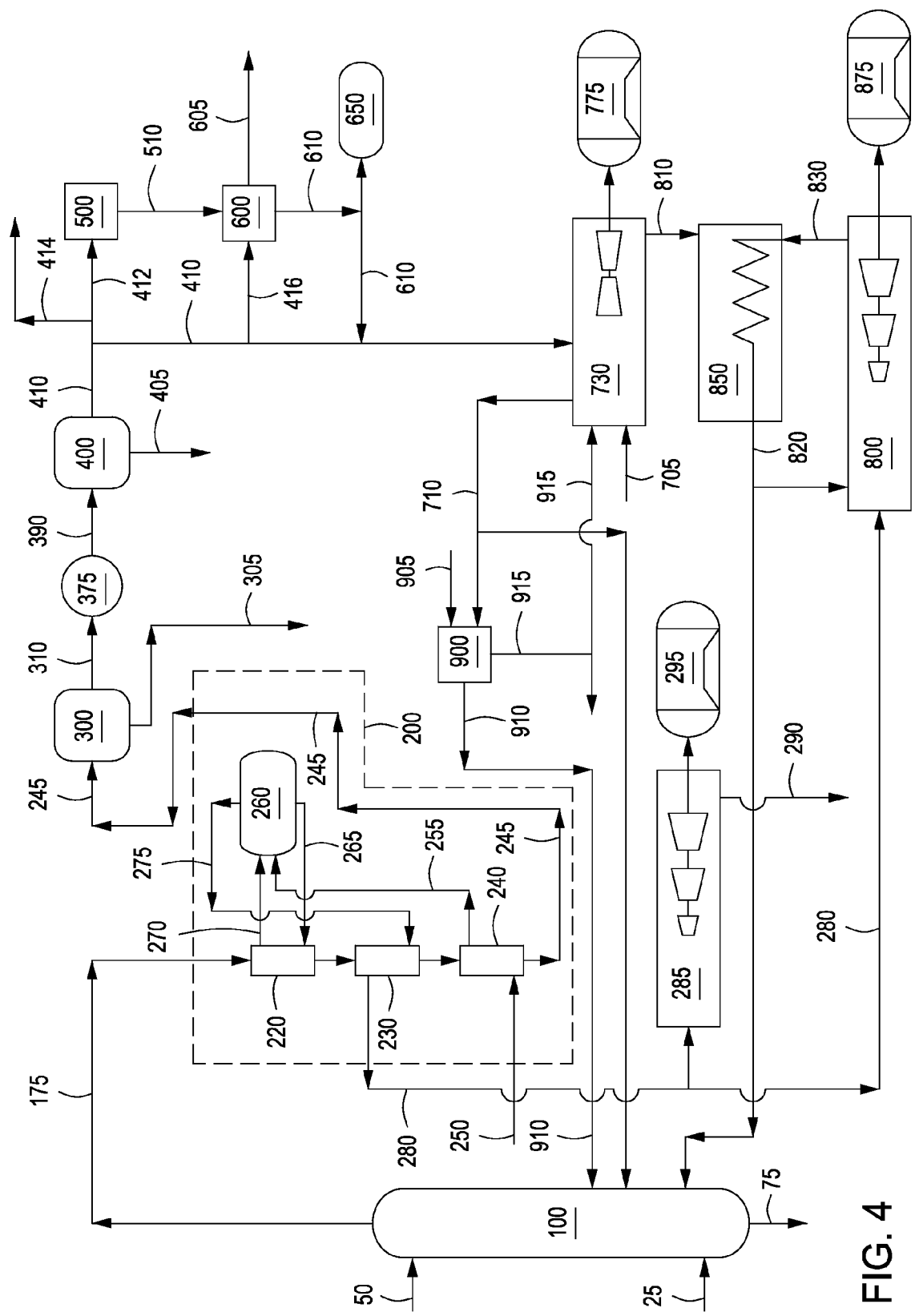
FIG. 4 depicts another illustrative gasification system utilizing the syngas heat recovery system depicted in FIG. 1, according to one or more embodiments described.

FIG. 4 depicts another illustrative gasification system utilizing the syngas heat recovery system depicted in FIG. 1, according to one or more embodiments. In one or more embodiments, the gasification system can include one or more integrated combustion turbines 730 to further enhance efficiency. The one or more gasifiers 100, raw syngas cooler 200, particulate removal systems 300, secondary coolers 375, gas purification systems 400, gas converters 500, hydrogen separators 600, steam turbines 285, 800, heat recovery systems 850, generators 295, 775, 875, heat recover system 850, air separation units 900, and high pressure superheated steam via line 280 can be as discussed and described above with reference to FIG. 3.

In one or more embodiments, at least a portion the syngas via line 410 and/or at least a portion of the hydrogen product via line 610 can be used as a fuel gas for one or more combustion turbines 730. The combustion turbine 730 can produce a high temperature exhaust gas and shaft power to drive the one or more generators 775. Heat from the combustion turbine exhaust gas via line 810 (generally about 600° C. (1,112° F.)) can be recovered using one or more heat recovery systems 850 to generate steam via line 820 for subsequent use in a steam turbine 800.

Ambient air via line 705 can be compressed using the combustion turbine 730 to provide compressed air via line 710 directly to the gasifier 100 and/or ASU 900. Nitrogen separated within the ASU 900 can be purged and/or returned to the one or more combustion turbines 730 via line 915 to reduce nitrogen oxide emissions by lowering the combustion temperature in the combustion turbine 730. The nitrogen acts as a diluent with no heating value, i.e. a heat sink. To further minimize nitrogen oxides formation, the syngas via line 410 entering the combustion turbine(s) 730 can be saturated with water (not shown).

Figure 5:
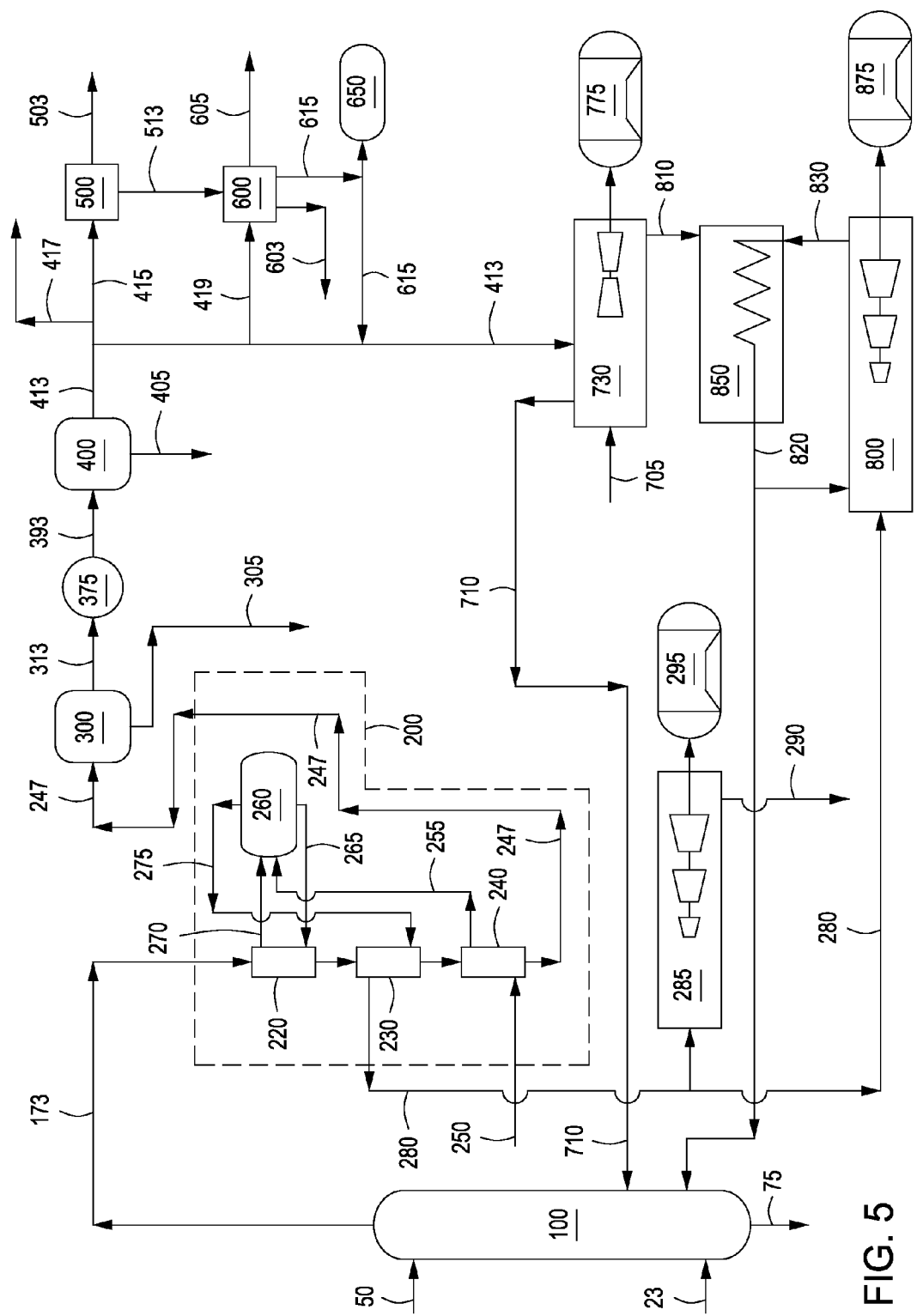
FIG. 5 depicts yet another illustrative gasification system utilizing the syngas heat recovery system depicted in FIG. 1, according to one or more embodiments described.

FIG. 5 depicts yet another illustrative gasification system utilizing the syngas heat recovery system depicted in FIG. 1, according to one or more embodiments. In one or more embodiments the one or more gasifiers 100, syngas cooler 200, particulate removal systems 300, secondary coolers 375, gas purification systems 400, gas converters 500, hydrogen separators 600, steam turbines 285, 800, combustion turbines 730, heat recovery systems 850, generators 295, 775, 875, and high pressure superheated steam via line 280 can be as discussed and described above with reference to FIG. 3.

The gasification system can utilize one or more nitrogen-containing oxidants via line 23 for gasification. The one or more nitrogen-containing oxidants via line 23 can include air; oxygen-enriched air; mixtures of oxygen and air; mixtures of oxygen and nitrogen; and the like. The nitrogen-containing oxidant can contain about 20 vol % or greater oxygen, or about 25 vol % or greater oxygen, or about 30 vol % or greater oxygen. The nitrogen-containing oxidant can contain 5 vol % nitrogen or more. The nitrogen content of the nitrogen-containing oxidant can range from a low of about 5 vol %, 10 vol %, or 20 vol % to a high of about 25 vol %, 50 vol %, or 80 vol %.

A raw syngas via line 173 containing one or more particulates and nitrogen can be cooled using the one or more raw syngas coolers 200 to provide a cooled raw syngas via line 247 and superheated or high pressure superheated steam via line 280. The one or more particulate removal systems 300 can be used to partially or completely remove the particulates from the cooled raw syngas via line 247 to provide a particulate effluent via line 305 and a separated syngas via line 313. The separated syngas via line 313 can be cooled using the one or more secondary coolers 375 to provide a cooler, separated syngas via line 393. The cooled, separated syngas via line 393 can be treated within the one or more gas purification systems 400 to provide a waste effluent via line 405, and a treated syngas via line 413.

At least a portion of the treated syngas via line 413 can be recovered via line 417 and sold as a commodity. At least a portion of the treated syngas via line 413 can be introduced to one or more gas converters 500 via line 415 to provide a converted syngas via line 513. The one or more gas converters 500 can include cryogenic or membrane type systems for separating nitrogen from the treated syngas via line 415 to provide a Fischer-Tropsch feed containing hydrogen cyanide and ammonia in amounts of about 20 ppbv or less, or about 10 ppbv or less. Nitrogen removal systems can also be used to maintain the nitrogen concentration within the system. Nitrogen can be recovered and/or purged from the system via line 503.

At least a portion of the converted syngas via line 513 can be sold or upgraded using further downstream processes (not shown). At least a portion of the converted syngas via line 513 can be directed to the one or more hydrogen separators 600. At least a portion of the treated syngas via line 413 can bypass the one or more gas converters 500 described above, and can be fed directly to the one or more hydrogen separators 600 via line 419.

The one or more hydrogen separators 600 can include one or more nitrogen separation units to remove at least a portion of the nitrogen to provide nitrogen free or essentially nitrogen-free hydrogen via line 615, and/or nitrogen-free or essentially nitrogen-free, carbon dioxide via line 605. The separated nitrogen can be recovered and/or purged from the system via line 603.

At least a portion of the hydrogen via line 615 can be used as a feed to one or more fuel cells 650. As described and discussed above with reference to FIG. 3, at least a portion of the hydrogen 615 can be combined with the treated syngas via line 413 prior to use as a fuel in the one or more combustors 750 (not shown). At least a portion of the hydrogen via line 615 can be combined with the treated syngas via line 413 prior to use as a fuel in the one or more combustion turbines 730. The one or more combustion turbines 730 can provide a turbine exhaust via line 810 and shaft power to one or more electric generators 775. The hydrogen via line 615 can include varying amounts of nitrogen depending on the nitrogen content of the treated syngas via line 415, converted syngas via line 513, and/or the amount of nitrogen removed in the gas converter 500 and/or hydrogen separator 600.

Heat from the combustion turbine exhaust gas via line 810 can be recovered using the one or more heat recovery systems 850 to generate steam via line 820 which can be introduced to the gasifier 100, or introduced to the steam turbine 800, which can provide shaft power to the one or more electric generators 875, and/or other auxiliary steam consuming process equipment (not shown). Lower pressure steam from the steam turbine 800 can be returned via line 830 to the heat recovery system 850. Residual heat from line 830 can be rejected to a condensation system well known to those skilled in the art or sold to local steam consumers.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A process for producing syngas and power therefrom, comprising:
   combining one or more feedstocks and one or more oxidants in a fluidized reaction zone operated at a temperature of from 550° C. to 1,050° C. to provide a syngas, wherein the oxidant comprises air, oxygen, essentially oxygen, oxygen-enriched air, mixtures of oxygen and air, mixtures of oxygen and inert gas, or mixtures thereof;
   indirectly exchanging heat in a first zone from the syngas to a condensate to provide steam and a cooled syngas having a first temperature of about 815° C. or less;
   indirectly exchanging heat in a second zone from the syngas cooled in the first zone to at least a portion of the steam produced in the first zone to provide superheated steam and a cooled syngas having a second temperature of about 704° C. or less;
   indirectly exchanging heat in a third zone from the syngas cooled in the second zone to a heat transfer medium consisting essentially of water to provide the condensate and a cooled syngas having a third temperature of about 260° C. to about 427° C., wherein the cooled syngas from the second zone is introduced into the third zone at about the second temperature;
   supplying at least a portion of the superheated steam produced in the second zone to one or more steam turbines to produce power; and
   supplying at least a portion of the condensate provided in the third zone to the first zone for indirect heat exchange with the syngas therein.

2. The process of claim 1 further comprising combusting at least a portion of the cooled syngas to provide an exhaust gas and supplying at least a portion of the exhaust gas to one or more turbines.

3. The process of claim 1, further comprising converting at least a portion of the cooled syngas to methanol, alkyl formates, dimethyl ether, ammonia, one or more Fischer-Tropsch products, derivatives thereof, or combinations thereof.

4. The process of claim 1, further comprising combining one or more sorbents containing limestone, dolomite, or both with the feedstock.

5. The process of claim 1, wherein the first temperature of the syngas is about 260° C. to about 815° C.

6. The process of claim 1, wherein the second temperature of the syngas is about 260° C. to about 704° C.

7. The process of claim 1, wherein the superheated steam has a pressure above 5,170 kPa and a temperature above 400° C.

8. The process of claim 1, wherein the condensate is at least partially saturated.

9. The process of claim 1, wherein the feedstock comprises biomass, coal, oil shale, coke, tar, asphaltenes, low ash polymers, no ash polymers, hydrocarbon-based polymeric materials, biomass derived material, by-product derived material from manufacturing operations, derivatives thereof, mixtures thereof, or combinations thereof.

10. A process for producing syngas and power therefrom, comprising:
    combining a solid feedstock comprising polymer, biomass, and coal with one or more oxidants in a reaction zone heated from 550° C. to 1,050° C. to produce a syngas, wherein the polymer is selected from the group consisting of polypropylene, polyethylene, polystyrene, polyethylene terephthalate, poly blends, other polyolefins, and poly-hydrocarbons limited to oxygen as an additional constituent, and wherein the oxidant comprises air, oxygen, essentially oxygen, oxygen-enriched air, mixtures of oxygen and air, mixtures of oxygen and inert gas, or mixtures thereof;
    indirectly exchanging heat in a first zone from the syngas to a condensate to provide steam and a cooled syngas having a first temperature;
    indirectly exchanging heat in a second zone from the syngas cooled in the first zone to at least a portion of the steam produced in the first zone to provide superheated steam having a temperature of about 450° C. or more and a cooled syngas having a second temperature;
    indirectly exchanging heat in a third zone from the syngas cooled in the second zone to a heat transfer medium consisting essentially of water to provide the condensate and a cooled syngas having a third temperature, wherein the cooled syngas from the second zone is introduced into the third zone at about the second temperature;
    supplying at least a portion of the superheated steam produced in the second zone to one or more steam turbines to produce power; and
    supplying at least a portion of the condensate provided in the third zone to the first zone for indirect heat exchange with the syngas therein.

11. The process of claim 10, further comprising supplying at least a portion of the cooled syngas to one or more gas converters to produce hydrogen, methanol, alkyl formates, dimethyl ether, ammonia, one or more Fischer-Tropsch products, derivatives thereof, or combinations thereof.

12. The process of claim 10, further comprising combining one or more sorbents containing limestone, dolomite, or both with the feedstock.

13. The process of claim 10, further comprising combusting at least a portion of the syngas to provide an exhaust gas and supplying at least a portion of the exhaust gas to one or more turbines.

14. The process of claim 10, wherein the first temperature of the syngas is about 815° C. or less.

15. The process of claim 10, wherein the second temperature of the syngas is about 704° C. or less.

16. The process of claim 10, wherein the third temperature of the syngas is about 260° C. to about 427° C.

17. The process of claim 10, wherein the superheated steam is at a pressure above 5,170 kPa and a temperature above 400° C.

18. A process for producing syngas and power therefrom, comprising:

combining one or more feedstocks and one or more oxidants in a fluidized reaction zone operated at a temperature of about 550° C. to about 1,050° C. to provide a syngas, wherein the one or more feedstocks is a solid selected from the group consisting of biomass, coal, oil shale, coke, tar, asphaltenes, low ash polymers, no ash polymers, hydrocarbon-based polymeric materials, biomass derived material, by-product derived material from manufacturing operations, derivatives thereof, mixtures thereof, and combinations thereof, and wherein the oxidant comprises air, oxygen, essentially oxygen, oxygen-enriched air, mixtures of oxygen and air, mixtures of oxygen and inert gas, or mixtures thereof;

indirectly exchanging heat in a first zone from the syngas to a condensate to provide steam and a cooled syngas having a first temperature;

indirectly exchanging heat in a second zone from the syngas cooled in the first zone to at least a portion of the steam produced in the first zone to provide superheated steam and a cooled syngas having a second temperature;

indirectly exchanging heat in a third zone from the syngas cooled in the second zone to a heat transfer medium consisting essentially of water to provide the condensate and a cooled syngas having a third temperature, wherein the cooled syngas from the second zone is introduced into the third zone at about the second temperature;

supplying at least a portion of the superheated steam produced in the second zone to one or more steam turbines to produce power; and supplying at least a portion of the condensate provided in the third zone to the first zone for indirect heat exchange with the syngas therein.

19. The method of claim 18, wherein the third temperature of the syngas is about 260° C. to about 427° C.

20. The method of claim 18, wherein a temperature of the superheated steam is about 450° C. or more.

21. The method of claim 18, wherein a pressure of the superheated steam is about 6,310 kPa or more.

22. The process of claim 18, further comprising supplying at least a portion of the cooled syngas to one or more gas converters to produce hydrogen, methanol, alkyl formates, dimethyl ether, ammonia, one or more Fischer-Tropsch products, derivatives thereof, or combinations thereof.

23. The process of claim 18, further comprising combining one or more sorbents containing limestone, dolomite, or both with the feedstock.

24. The process of claim 18, further comprising combusting at least a portion of the syngas to provide an exhaust gas and supplying at least a portion of the exhaust gas to one or more turbines.

* * * * *